United States Patent
Grata

(10) Patent No.: US 7,089,642 B2
(45) Date of Patent: Aug. 15, 2006

(54) DEVICE USED TO PROTECT/REPAIR DEBRIS CHUTE

(76) Inventor: Stanley G. Grata, 349 Grata Rd., Ebensburg, PA (US) 15931

( * ) Notice: Subject to any disclaimer, the term of this patent is extended or adjusted under 35 U.S.C. 154(b) by 0 days.

(21) Appl. No.: 11/188,838

(22) Filed: Jul. 26, 2005

(65) Prior Publication Data

US 2006/0064863 A1 Mar. 30, 2006

Related U.S. Application Data

(60) Provisional application No. 60/605,558, filed on Aug. 31, 2004.

(51) Int. Cl.
*B23P 6/00* (2006.01)
*B23P 19/04* (2006.01)
*B65G 11/14* (2006.01)
*F16L 55/18* (2006.01)

(52) U.S. Cl. .............. 29/402.09; 29/402.08; 29/402.14; 29/423; 193/30; 138/97

(58) Field of Classification Search ..............
29/402.01–402.15, 418, 423; 193/30; 138/97–99, 138/107, 110–114, 120, 137, 161; 182/48, 182/239, 71, 72, 76; 52/732.1
See application file for complete search history.

(56) References Cited

U.S. PATENT DOCUMENTS

| | | | | |
|---|---|---|---|---|
| 1,032,078 A * | 7/1912 | Osborn | .......................... | 138/99 |
| 2,772,764 A * | 12/1956 | McClellan | .................... | 193/4 |
| 3,949,850 A * | 4/1976 | Schumm | .................... | 193/25 E |
| 4,644,975 A * | 2/1987 | Fricker | ........................ | 138/110 |
| 5,012,842 A * | 5/1991 | Savard | ........................ | 138/161 |
| 5,027,862 A * | 7/1991 | Laybourn | .................... | 138/99 |
| 5,123,451 A * | 6/1992 | Savard | ........................ | 138/99 |
| 5,360,143 A | 11/1994 | Stultz | | |
| 5,443,096 A * | 8/1995 | King | .......................... | 138/99 |
| 5,497,808 A * | 3/1996 | Schlund et al. | ............... | 138/99 |
| 5,630,446 A * | 5/1997 | Stallings | ..................... | 138/99 |
| 5,722,463 A * | 3/1998 | Smyth et al. | ............... | 138/170 |
| 5,950,683 A * | 9/1999 | Henderson et al. | ........... | 138/99 |
| 6,216,842 B1 | 4/2001 | Beale et al. | | |
| 6,279,715 B1 | 8/2001 | Herren | | |
| 6,296,021 B1 * | 10/2001 | Lew | .......................... | 138/99 |
| 6,367,606 B1 | 4/2002 | Skalla et al. | | |
| 6,390,136 B1 * | 5/2002 | Hutchins et al. | ........... | 138/109 |
| 2003/0226737 A1 | 12/2003 | Quigley | | |
| 2004/0011415 A1 * | 1/2004 | Kakoschke et al. | ........... | 138/99 |

FOREIGN PATENT DOCUMENTS

| | | |
|---|---|---|
| DE | 4020949 A1 | 1/1992 |
| FR | 2618828 A1 | 2/1989 |
| JP | 52-145965 | 12/1977 |

* cited by examiner

Primary Examiner—David P. Bryant
Assistant Examiner—Christopher M. Koehler
(74) Attorney, Agent, or Firm—Richard C. Litman

(57) ABSTRACT

The device used to protect/repair a debris chute is a sheet of material adapted to fit over and between the conical funnel sections of construction debris chute. Two chain segments are attached to the sheet to allow a user to connect the sheet to the two chute support chains, which support the conical funnel sections of a construction debris chute. Each of the chain segments are connected to a clevis, shackle, or bolt for connecting the chain segments to the support chains. The sheet of material is of a suitable material and of suitable size and thickness to properly withstand the impact of falling material that would typically be dropped down a construction debris chute.

9 Claims, 3 Drawing Sheets

DEVICE USED TO PROTECT/REPAIR DEBRIS CHUTE

CROSS-REFERENCE TO RELATED APPLICATION

This application claims the benefit of U.S. Provisional Patent Application Ser. No. 60/605,558, filed Aug. 31, 2004.

1. Field of the Invention

The present invention relates to a device for repairing a damaged debris chute without the need to disassemble the entire chute apparatus. The device may also be used to protect unused chute hoppers.

2. Description of the Related Art

Debris chutes are often used at construction sites, especially at construction sites for large buildings, so that trash and debris is safely conveyed to the ground without the danger of the trash or debris landing on a person. The debris chutes generally consist of a series of conical funnel sections connected by two parallel chains. Each conical funnel section has a smaller bottom outer diameter than the top inner diameter. The bottom of each funnel section, except for the last funnel section, sits within the top of the funnel section below it. Certain funnel sections, usually one corresponding to each floor of a building, include a hopper so that trash or debris may be inserted into the chute to fall safely to a ground level debris area. Debris falling down these chutes, however, often bounces off the walls of the funnel sections and will sometimes bump into and damage the sides of the funnel sections or the bottom walls of the hopper. Holes in the sides of the funnel sections could allow debris or trash to fall out of the chute and onto a bystander on the ground. The configuration of these chutes, each funnel section being interconnected, makes the process of replacing any funnel section very difficult and time consuming. Thus a device for quickly repairing debris chutes is desired. Hopper sections are also very expensive to replace. Thus, a device for protecting unused hoppers is also desired.

French Patent No. 2,618,828, published Feb. 3, 1989, discloses a process for repairing rubbish chutes by placing a metal band against the inside wall and rolling it into a spiral along the inside wall of the chute. Japanese Patent No. 52-145,965, published Dec. 5, 1977 and Japanese Patent No. 5-141,100, published Jun. 8, 1993 disclose other chute repair methods.

Other chute linings that protect the chute have been attempted, but these linings are used to protect a chute and are not used to repair a damaged chute or to protect a hopper while not in use. Publications describing such improvements to chutes include U.S. Pat. No. 6,367,606, issued Apr. 9, 2002 to Skalla et al.; U.S. Pat. No. 6,684,999, issued Feb. 3, 2004 to R. Howard; U.S. Pat. No. 6,279,715, issued Aug. 28, 2001 to H. Herren; U.S. Pat. No. 6,216,842, issued Apr. 17, 2001 to Beale et al.; U.S. Pat. No. 5,360,143, issued Nov. 1, 1994 to J. Stultz; U.S. Pat. No. 5,244,069, issued Sep. 14, 1993 to J. Cosgrove; U.S. Pat. No. 5,184,706, issued Feb. 9, 1993 to R. Christenson; U.S. Pat. No. 5,055,336, issued Oct. 8, 1991 to V. Davis; U.S. Pat. No. 4,946,071, issued Aug. 7, 1990 to B. Poulton; U.S. Pat. No. 4,645,055, issued Feb. 24, 1987 to Griese et al.; U.S. Pat. No. 4,234,182, issued Nov. 18, 1980 to T. Camilleri; German Patent No. 4,020,949, published Jan. 9, 1992; and Japanese Patent No. 7-228,319, published Aug. 29, 1995.

Other chute accessories have been used to control the flow of material as it exits a chute. Publications describing such attachments to chutes include U.S. Patent Publication No. 2003/0226737, published Dec. 11, 2003; U.S. Pat. No. 2,050,774, issued Aug. 11, 1936 to R. W. Wilcox; U.S. Pat. No. 4,688,667, issued Aug. 25, 1987 to J. Peterson; and U.S. Pat. No. 5,531,518, issued Jul. 2, 1996 to K. Alves;

U.S. Pat. No. 5,927,461, issued Jul. 27, 1999 to J. Jamieson, discloses an automatic sealing articulated chute. Other patents disclosing safety devices for chute joints include U.S. Pat. No. 6,719,118, issued Apr. 13, 2004 to Eull et al.; U.S. Pat. No. 4,919,249, issued Apr. 14, 1990 to D. Alexander; U.S. Pat. No. 5,660,260, issued Aug. 26, 1997 to R. Bareiss; and U.S. Pat. No. 3,542,179, issued Nov. 24, 1970 to E. Prichard.

None of the above inventions and patents, taken either singly or in combination, is seen to describe the instant invention as claimed. Thus, a device used to protect/repair debris chute solving the aforementioned problems is desired.

SUMMARY OF THE INVENTION

The device used to protect/repair a debris chute is a sheet of material adapted to fit over and between the conical funnel sections of construction debris chute. Two chain segments are attached to the sheet to allow a user to connect the sheet to the two chute support chains, which support the conical funnel sections of a construction debris chute. Each of the chain segments are connected to a clevis, shackle, or bolt for connecting the chain segments to the support chains. The sheet of material is of a suitable material and of suitable size and thickness to properly withstand the impact of falling material that would typically be dropped down a construction debris chute.

When repairing a damaged chute, the sheet is positioned by the use of the chain segments over any damaged funnel section, with the bottom section of the sheet being placed within the funnel section below the damaged funnel section.

The device may also be used to protect hoppers when the hoppers are not in use. To protect a hopper, the sheet is positioned by the chain segments between a hopper section and the above funnel section, with the top of the sheet against the outside of an upper funnel section, and the bottom section covering the hole of the hopper by being positioned against the inside of the hopper section.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a chute repair and hopper protection device, generally designated as 10 in the figures.

Figure 1:
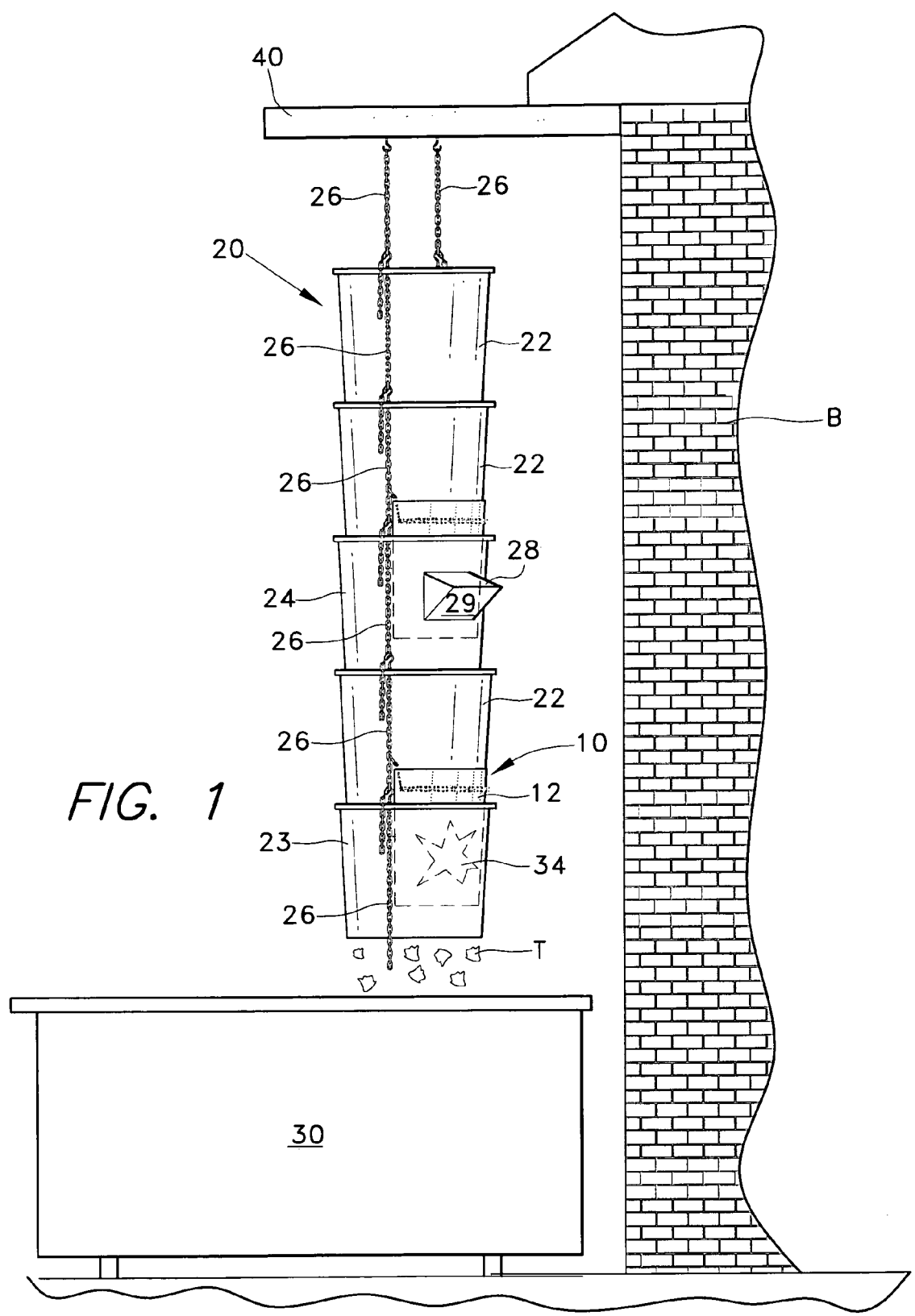
FIG. 1 is an environmental, perspective view of a device used to protect or repair debris chutes according to the present invention.

FIG. 1 depicts a typical construction debris chute, generally designated as 20 in the figures. The debris chute 20 is a series of conical funnel sections 22 suspended in a series by chains 26. The bottom of each funnel section 22 is inserted into the top of the funnel section 22 below it, so that material inserted into the chute 20 will always fall through the series of funnel sections 22. Thus, debris and trash thrown into the chute 20 will travel safely to a debris dumpster 30 or other suitable trash collecting area without risk of falling onto a bystander. The suspending chains 26 are connected to a support 40 on the top of the building B being constructed. Special hopper funnel sections 24 are also provided, which are similar in structure to the normal funnel sections 22, but also include a hopper 28, or open passage, for the insertion of debris or other trash into the debris chute 20. Typical construction chutes will include multiple hopper funnel sections, usually one hopper section 28 for each floor of the building being constructed. The hopper 28 has a bottom wall 29, which is often damaged by falling debris inserted from higher floors.

In a first use of the invention, the device includes a sheet body 12 that is inserted between the hopper funnel section 24 and the funnel section 22 directly above the hopper funnel section 24. The sheet 12 is positioned against the inside wall of the hopper funnel section 24, blocking the hole of the hopper 28, and thus preventing any debris from hitting the bottom wall 29 of the hopper 28. The bottom of the sheet 12 is positioned at an appropriate depth below the bottom of hopper opening. The device 10 thereby protects a hopper funnel section when that hopper is not being used.

Other sidewalls of the funnel sections 22 could potentially be damaged by falling debris. When a funnel section 22 is perforated or weakened, debris may fall out of the chute onto a bystander. Thus, a damaged funnel section 23 must be replaced or repaired. The present invention can be used to repair a damaged funnel section without having to disassemble the entire debris chute.

In a first method of repairing a damaged funnel section, the top part of the sheet 12 is positioned against the outside of the funnel section 22 above the damaged funnel section 23, and the bottom part of the sheet 12 is positioned against the inside wall of the damaged funnel section 23 covering the damaged part 34 of the damaged funnel section 23 so that debris traveling down the chute 20 will not fall out of the chute 20.

Figure 3:
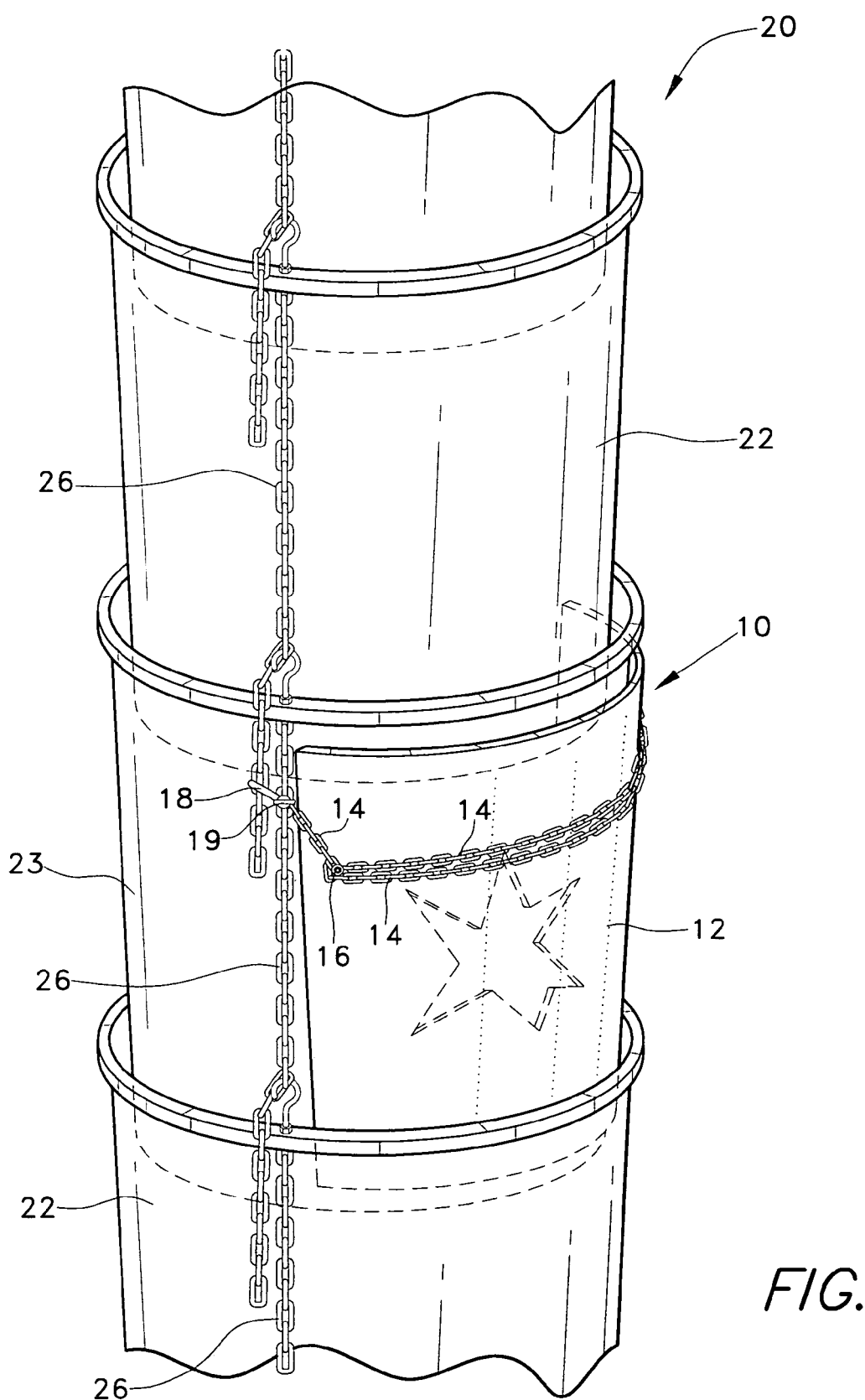
FIG. 3 is a fragmented environmental perspective view of the device used to repair the damaged chute of FIG. 2.

Another way of repairing a chute is shown in FIG. 3. The sheet 12 may be placed against the outside of a damaged funnel section 23 with the bottom of the sheet 12 placed against the inside of the funnel section 22 below the damaged funnel section 23.

Figure 2:
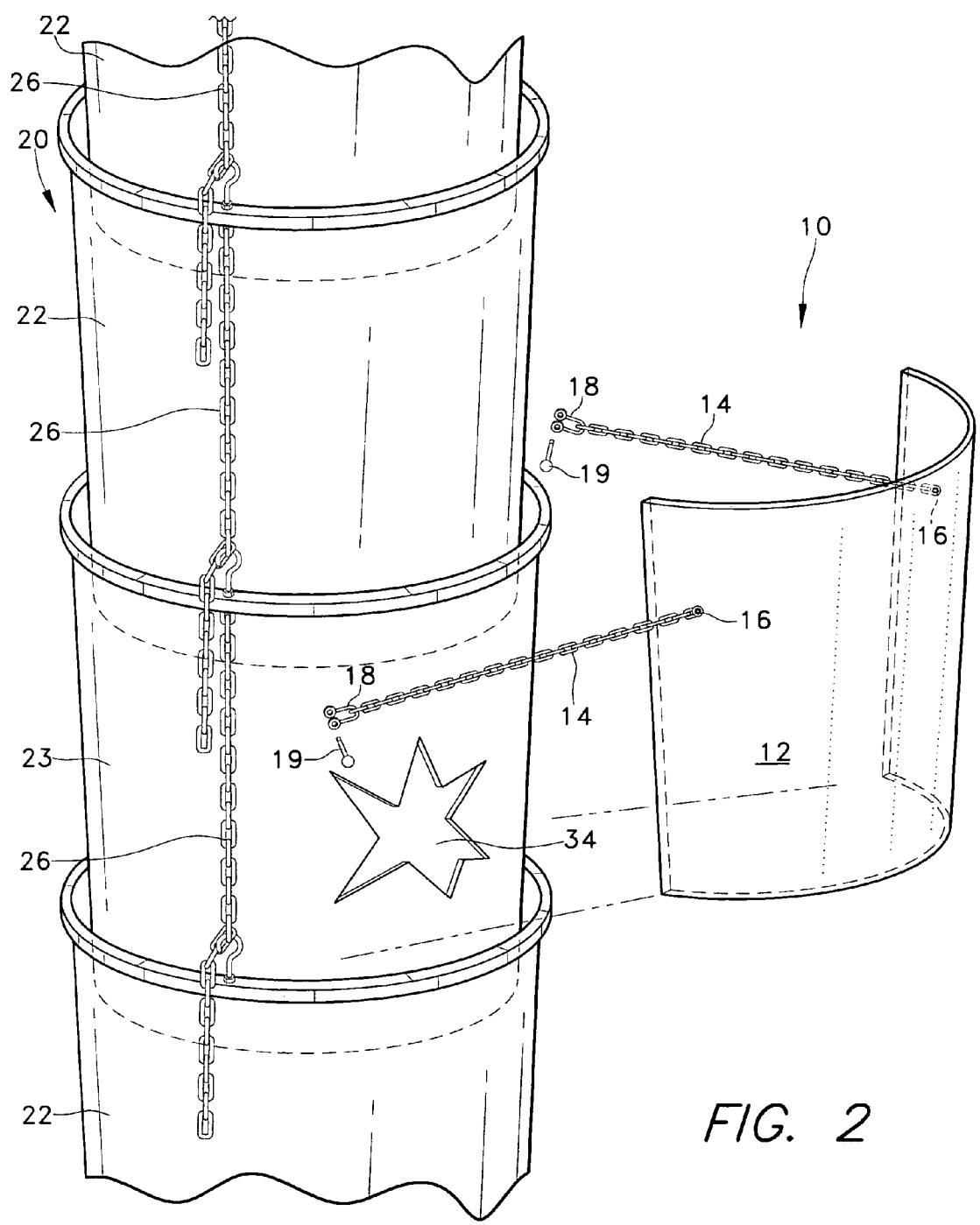
FIG. 2 is an exploded, fragmented, environmental perspective view of a damaged chute and the device.

FIG. 2 shows an exploded view of the device 10 for placement over a damaged funnel section of a chute. The sheet 12 is approximately three feet wide and three feet tall. The sheet 12 is approximately ¼ inch thick and preferably made of a suitable plastic material, such as the same plastic material as the funnel sections 22. The sheet 12 could also be made out of fiberglass, aluminum, or any other suitably strong and relatively inexpensive material. The sheet 12 is connected to two chain segments 14 by eyebolts 16 positioned about four inches from the top of the sheet 12 and about eight inches from each side of the sheet 12. Each chain 14 is about four feet in length. A clevis 18 is attached to the end of each chain 14 for connection to the chute support chains 26 for positioning the sheet in the desired position along the chute funnel sections. A bolt 19 may be used either with the clevis 18 or by itself to secure the end of the chains 14 to the chute support chains 26. Other securing means, such as a different type of shackle, may be used in place of a clevis 18 and bolt 19.

FIG. 3 shows the invention 10 in place protecting a damaged funnel section 23 by covering up a hole. The majority of the sheet 12 is placed along the outside wall of the damaged funnel section 23 against the damaged part or hole of the damaged funnel section 23 and a bottom portion of the sheet 12 is placed along the inside of the funnel section 22 immediately below the damaged funnel section 23. As shown, the chain segments 14 are attached to the chute support chains 26 by the clevis 18 and bolt 19. The chain segments are wrapped around the adjacent eyebolt 16, thus controlling the positioning of the sheet with respect to the chute support chains 26.

The use of the device 10 will protect expensive chute hoppers 28 and help reduce the cost of replacing broken funnel sections 23, and also reduce time needed to replace broken funnel sections 23 by eliminating the need to disassemble the chute when a funnel section 22 is damaged.

It is to be understood that the present invention is not limited to the embodiments described above, but encompasses any and all embodiments within the scope of the following claims.

I claim:

1. A device for repairing and protecting the hopper and connected conical funnel sections of construction debris chutes, comprising:
   a sheet of material sufficient to insert between successive conical funnel sections;
   at least two opposed chain segments having first and second ends, the first end of each of the chain segments being attached to said sheet of material; and
   means for attaching the second end of each of the chain segments to a conical funnel section.

2. The device of claim 1 wherein said sheet comprises a horizontally curved sheet of material, said sheet curved to correspond with the curve of the conical funnel.

3. The device of claim 1 wherein the sheet of material is selected from the group consisting of aluminum, plastic, steel and wood materials.

4. The device of claim 1 wherein the opposed chains are dimensioned and configured to be connected to the opposed vertical sides of the sheet.

5. The device of claim 1 wherein the second ends of each of the chain segments are attached to opposing sides of a conical funnel section by bolts.

6. The device of claim 1, there further being support chains, wherein the second ends of each of the chain segments are attached to said support chains supporting the funnel sections of the debris chute.

7. The device of claim 1 wherein the conical funnel section includes the hopper section.

8. A method for repairing damaged funnel sections of debris chutes, comprising:
   preparing a curved sheet of material larger than the damaged portion of the funnel section;
   attaching one end of two chains to each opposing vertical side of the sheet;
   inserting a portion of the sheet at the juncture between the damaged funnel section and the adjoining funnel section; and
   attaching the second end of the chains of the sheet to the funnel section.

9. The method of claim 8 wherein the damaged funnel section includes the hopper section.

* * * * *